(12) United States Patent
Tan et al.

(10) Patent No.: US 11,566,734 B2
(45) Date of Patent: Jan. 31, 2023

(54) THREE-WAY CLAMP AND CONNECTOR PREFABRICATED COMPONENT INCLUDING CLAMP

(71) Applicant: WEIFANG 100TONG CASTING CO., LTD., Weifang (CN)

(72) Inventors: Yan Tan, Weifang (CN); Yanjun Wang, Weifang (CN)

(73) Assignee: WEIFANG 100TONG CASTING CO., LTD., Weifang (CN)

( * ) Notice: Subject to any disclaimer, the term of this patent is extended or adjusted under 35 U.S.C. 154(b) by 716 days.

(21) Appl. No.: 16/572,649

(22) Filed: Sep. 17, 2019

(65) Prior Publication Data
US 2020/0378532 A1 Dec. 3, 2020

(30) Foreign Application Priority Data
May 30, 2019 (CN) .......................... 201910461807.8

(51) Int. Cl.
*F16L 23/04* (2006.01)
*F16L 41/02* (2006.01)
(Continued)

(52) U.S. Cl.
CPC ............... *F16L 23/12* (2013.01); *F16L 17/04* (2013.01); *F16L 21/06* (2013.01); *F16L 23/04* (2013.01); *F16L 23/22* (2013.01); *F16L 41/021* (2013.01)

(58) Field of Classification Search
CPC ......... F16L 23/04; F16L 23/032; F16L 17/04; F16L 17/02; F16L 17/025; F16L 17/06; F16L 21/06; F16L 21/065; F16L 41/02
(Continued)

(56) References Cited

U.S. PATENT DOCUMENTS

| 1,020,123 | A | * | 3/1912 | Brampton et al. ...... | F16L 17/04 |
| | | | | | 285/133.11 |
| 2,146,067 | A | * | 2/1939 | Graham .................. | F16L 21/06 |
| | | | | | 285/133.11 |

(Continued)

FOREIGN PATENT DOCUMENTS

| CN | 201748094 U | 2/2011 |
| CN | 207539492 U | 6/2018 |

(Continued)

*Primary Examiner* — Matthew Troutman
*Assistant Examiner* — Fannie C Kee
(74) *Attorney, Agent, or Firm* — Bayramoglu Law Offices LLC (57) ABSTRACT

A three-way clamp includes a first clamp shell and a second clamp shell capable of being connected to or detached from each other. Each of the first clamp shell and the second clamp shell includes three engaging portions. The engaging portion includes an accommodating cavity. The two clamp shells are respectively provided with an engaging claw and an engaging groove. A connector prefabricated component including the clamp includes a connecting pipe fixed in the clamp body, wherein the accommodating cavity is provided with a sealing component for sleeving pipe opening. During construction, a straight pipe to be connected is inserted into the sealing component. Then the clamp body is tightened, and the sealing component tightly presses on a pipe body of the straight pipe to achieve sealing.

7 Claims, 9 Drawing Sheets

(51) Int. Cl.
  *F16L 23/12* (2006.01)
  *F16L 23/22* (2006.01)
  *F16L 21/06* (2006.01)
  *F16L 17/04* (2006.01)

(58) Field of Classification Search
  USPC .......................................................... 285/373
  See application file for complete search history.

(56) References Cited

U.S. PATENT DOCUMENTS

| | | | | | |
|---|---|---|---|---|---|
| 3,633,943 | A | * | 1/1972 | Ramm | F16L 41/02 |
| | | | | | 285/133.11 |
| 3,944,260 | A | * | 3/1976 | Petroczky | F16L 17/04 |
| | | | | | 285/179 |
| 4,461,498 | A | * | 7/1984 | Kunsman | F16L 17/04 |
| | | | | | 285/55 |
| 5,842,725 | A | * | 12/1998 | Allert | F16L 21/06 |
| | | | | | 285/369 |
| 8,820,795 | B2 | * | 9/2014 | Dole | F16L 17/04 |
| | | | | | 285/179 |
| 9,182,058 | B2 | * | 11/2015 | Cygler, III | F16L 17/04 |
| 2008/0277015 | A1 | * | 11/2008 | Tanaka | F16L 21/06 |
| | | | | | 138/121 |
| 2013/0200610 | A1 | * | 8/2013 | Cygler, III | F16L 17/04 |
| | | | | | 285/179 |
| 2013/0327415 | A1 | * | 12/2013 | Camp, Jr. | F16L 41/02 |
| | | | | | 285/133.11 |

FOREIGN PATENT DOCUMENTS

| | | | | | |
|---|---|---|---|---|---|
| DE | 102008022492 | A1 | * | 12/2008 | ............. F16L 21/06 |
| GB | 2211255 | A | * | 6/1989 | ............. F16L 17/04 |
| JP | 2000161569 | A | * | 6/2000 | ............. F16L 41/02 |
| KR | 20090066767 | A | * | 6/2009 | ............. F16L 17/04 |

* cited by examiner

THREE-WAY CLAMP AND CONNECTOR PREFABRICATED COMPONENT INCLUDING CLAMP

CROSS REFERENCE TO THE RELATED APPLICATIONS

This application is based upon and claims priority to Chinese Patent Application No. 201910461807.8, filed on May 30, 2019, the entire contents of which are incorporated herein by reference.

TECHNICAL FIELD

The present disclosure belongs to the technical field of pipeline connectors, in particular to a three-way clamp and a connector prefabricated component including the clamp.

BACKGROUND

The operation of connecting two pipes using connectors during pipeline construction usually includes aligning openings of the two pipes to be connected, and then connecting the two pipes by mounting a special connector. At present, there are many such connectors. For example, a clamp type pipe connector disclosed in a patent having an application number of CN201748094U is a connector of this type.

Due to a large number of openings to be connected in this connection mode, for example, a specific connecting point needs to be linked to multiple pairs of openings (such as using a three-way pipe or a four-way pipe for connection) at the same time; for another example, a certain connecting point needs to accomplish the turning of the pipeline (e.g. using an elbow for connection). Each pair of openings to be connected needs to employ a special connector. It is required to complete the alignment and connection of the openings to be connected; dismounting and mounting of the connectors on site. The operation is complicated, the installation error is large, and an operator with high skill is required. The above operations must be individually performed on each pair of openings to be connected, and the operating efficiency is low.

There are also some quick mount connectors such as a snap-fit quick connector disclosed in the patent having an application number of CN207539492U. However, the connector is designed in such a manner that the connecting components are integrated into an interior of a connector main body, thus the connector has a complicated structure and a high manufacturing cost. Moreover, the connector main body cannot employ standard components, thus having a poor generality and interchangeability.

In summary, there obviously exist some inconvenience and deficiency during the practical use of the prior art, thus it is imperative to improve upon the prior art.

SUMMARY

In view of the above deficiencies, an objective of the present disclosure is to provide a three-way clamp and a connector prefabricated component including the clamp, wherein a clamp body is formed by a first clamp shell and a second clamp shell which are capable of being disassembled and assembled. Each of the first clamp shell and the second clamp shell includes at least two engaging portions. Each engaging portion includes a first engaging ring, a second engaging ring, and an accommodating cavity. The present disclosure further provides a connector prefabricated component including the clamp, wherein a connecting pipe is provided in the clamp for sleeving a sealing component. During the operation, a straight pipe to be connected is inserted into the sealing component. Then the clamp body is tightened, and the sealing component tightly presses on a pipe body of the straight pipe to achieve sealing. The second engaging ring in the clamp body is engaged with a second engaging groove of the straight pipe to achieve fixing. Compared with the prior art, the present disclosure is highly integrated, and simplifies the complicated mounting steps into the insertion of the pipe heads and the tightening of the clamp, thereby reducing the skill requirements of the operator. The operation has simple steps, and small mounting error, the worker training cost is effectively reduced, and the operating efficiency is greatly improved.

To this end, the present disclosure provides a three-way clamp including a clamp body, wherein the clamp body includes a first clamp shell and a second clamp shell which can be connected to or detached from each other; each of the first clamp shell and the second clamp shell includes three engaging portions; each engaging portion includes a first engaging ring, a second engaging ring, and an accommodating cavity for fixing a sealing component.

The first clamp shell is provided with an engaging claw, the second clamp shell is correspondingly provided with an engaging groove; the engaging claw includes an engaging neck for being engaged with the engaging groove, and an engaging head connected to the engaging neck.

According to the three-way clamp of the present disclosure, a reserved space is provided between each pair of the engaging portions.

According to the three-way clamp of the present disclosure, a width of the engaging head is larger than a width of the engaging groove.

According to the three-way clamp and the connector prefabricated component including the clamp of the present disclosure, the clamp body is made of cast iron.

According to the three-way clamp and the connector prefabricated component including the clamp of the present disclosure, bolt holes corresponding to one another are respectively provided on the first clamp shell and the second clamp shell.

The connector prefabricated component including the clamp includes: a connecting pipe fixed in the clamp body; wherein the connecting pipe includes three pipe openings; the three pipe openings are engaged with the engaging portions in a one-to-one correspondence; the accommodating cavity of each engaging portion is mounted with the sealing component for sleeving the pipe opening.

The sealing component includes a pipe body capable of expanding and retracting elastically. A first sealing ring and a second sealing ring are provided on an inner wall of the pipe body.

Each pipe opening of the connecting pipe is provided with a first engaging groove for being engaged with the first engaging ring and a sealing engaging groove for being engaged with the first sealing ring.

According to the connector prefabricated component of the present disclosure, a cross-section of the second sealing ring is arc-shaped.

According to the connector prefabricated component of the present disclosure, a cross-section of the second sealing ring is barb-shaped.

According to the connector prefabricated component of the present disclosure, a cross-section of a bottom of the sealing engaging groove is arc-shaped.

According to the connector prefabricated component of the present disclosure, the first sealing ring is provided with an arc-shaped protrusion matched with the bottom of the sealing engaging groove.

According to the connector prefabricated component of the present disclosure, the first sealing ring is further provided with a limit surface to limit an axial movement of the sealing component.

According to the connector prefabricated component of the present disclosure, a bolt is threaded into the bolt holes, and a nut is screwed on the bolt.

According to the connector prefabricated component of the present disclosure, the sealing component is made of rubber.

It is an objective of the present disclosure to provide the three-way clamp, wherein the clamp body is formed by the first clamp shell and the second clamp shell which are capable of being disassembled or assembled. Each of the first clamp shell and the second clamp shell includes at least two engaging portions. Each engaging portion includes the first engaging ring, the second engaging ring, and the accommodating cavity. The present disclosure also provides the connector prefabricated component including the clamp, wherein the connecting pipe is provided in the clamp for sleeving the sealing component. During the operation, the straight pipe to be connected is inserted into the sealing component. Then the clamp body is tightened, and the sealing component tightly presses on the pipe body of the straight pipe to achieve sealing. The second engaging ring in the clamp body is engaged into the second engaging groove of the straight pipe to achieve fixing. Compared with the prior art, the present disclosure is highly integrated, which simplifies the complicated assembling steps into the insertion of the pipe heads and the tightening of the clamp, thereby reducing the skill requirements of the operator. The operation has simple steps, and small mounting error; the worker training cost is effectively reduced, and the operating efficiency is exceedingly improved.

In the figures: 1—clamp body, 11—engaging portion, 111—first engaging ring, 112—second engaging ring; 12—first clamp shell, 121—engaging claw, 1211—engaging neck, 1212—engaging head; 13—second engaging shell, 131—engaging groove; 14—bolt hole, 15—accommodating cavity, 16—reserved space; 2—connecting pipe, 21—first engaging groove, 22—sealing engaging groove; 3—sealing component, 31—first sealing ring, 311—arc-shaped protrusion, 312—limit surface; 32—second sealing ring; 4—straight pipe, 41—second engaging groove.

DETAILED DESCRIPTION OF THE EMBODIMENTS

To illustrate the objectives, technical solutions and advantages of the present disclosure more definitely and clearly, the present disclosure is described in detail hereinafter with reference to the figures and embodiments. It should be understood that, the specific embodiment described herein is merely used for explaining the present disclosure, rather than limiting the present disclosure.

Figure 2:
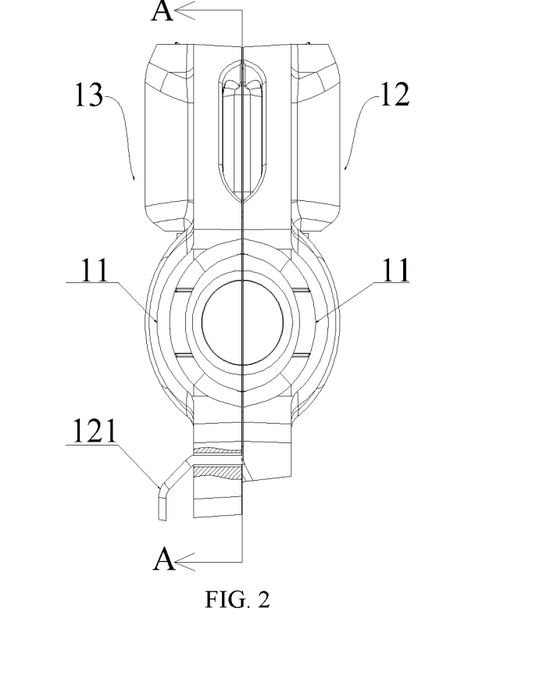
FIG. 2 is a side view of FIG. 1.
Figure 3:
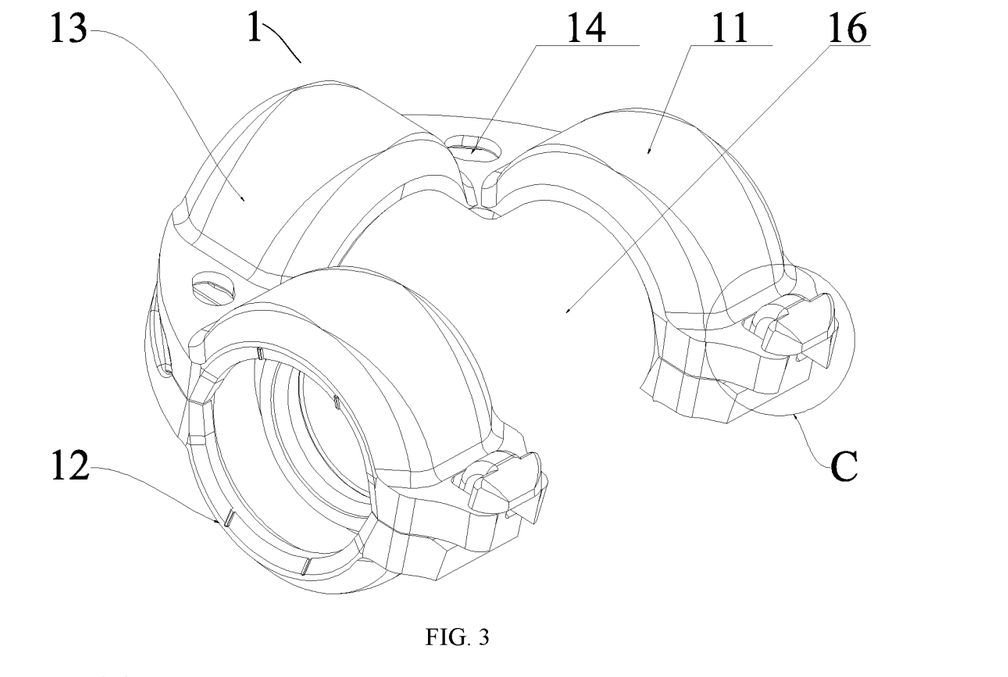
FIG. 3 is a perspective view showing a clamp body of an embodiment according to the present disclosure.
Figure 4:
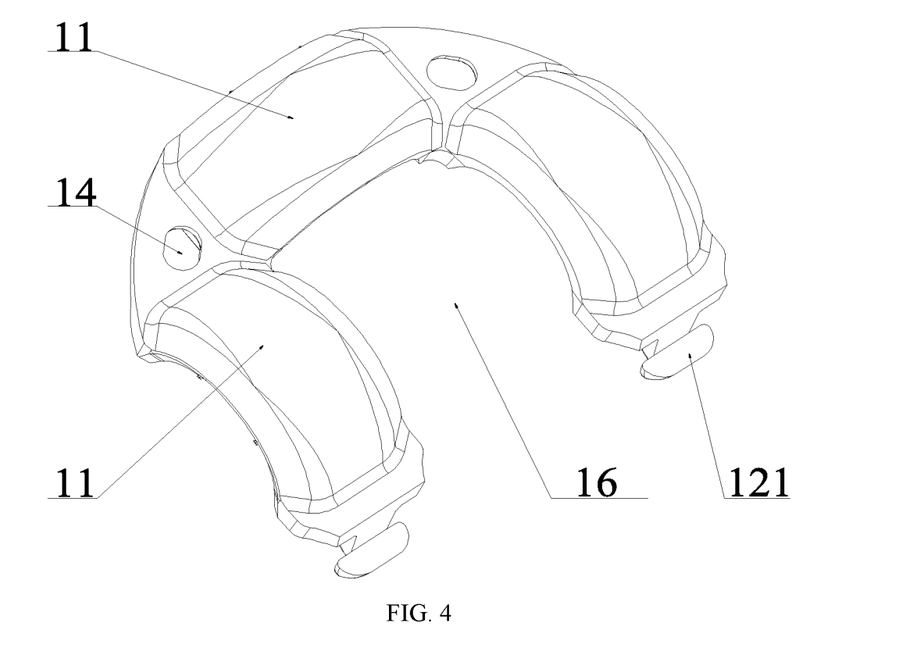
FIG. 4 is a perspective view showing a first clamp shell in FIG. 3.
Figure 5:
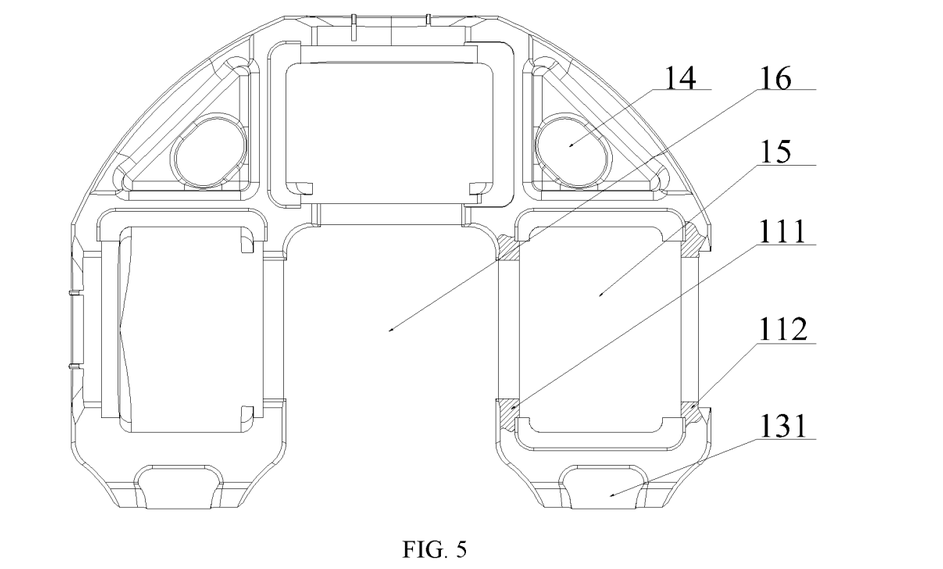
FIG. 5 is a schematic diagram showing an inner structure of a second clamp shell in FIG. 3.

As shown in FIG. 3, the present disclosure provides a three-way clamp, including the clamp body 1. As shown in FIG. 2, the clamp body 1 includes the first clamp shell 12 and the second clamp shell 13. Referring to FIG. 3 and FIG. 4, each of the first clamp shell 12 and the second clamp shell 13 includes three engaging portions 11. As shown in FIG. 5, the engaging portion 11 includes the first engaging ring 111, the second engaging ring 112, and the accommodating cavity 15.

The first clamp shell 12 and the second clamp shell 13 are provided with the bolt holes 14 corresponding to each other. A bolt can be threaded into the bolt holes 14 and fixed with a nut to realize the connection between the first clamp shell 12 and the second clamp shell 13. Meanwhile, the first clamp shell and the second clamp shell can be tightly compressed and released through the nut. The number of bolt holes 14 can be adaptably set as one, two, three, or four according to the specification of the clamp body 1.

Figure 15:
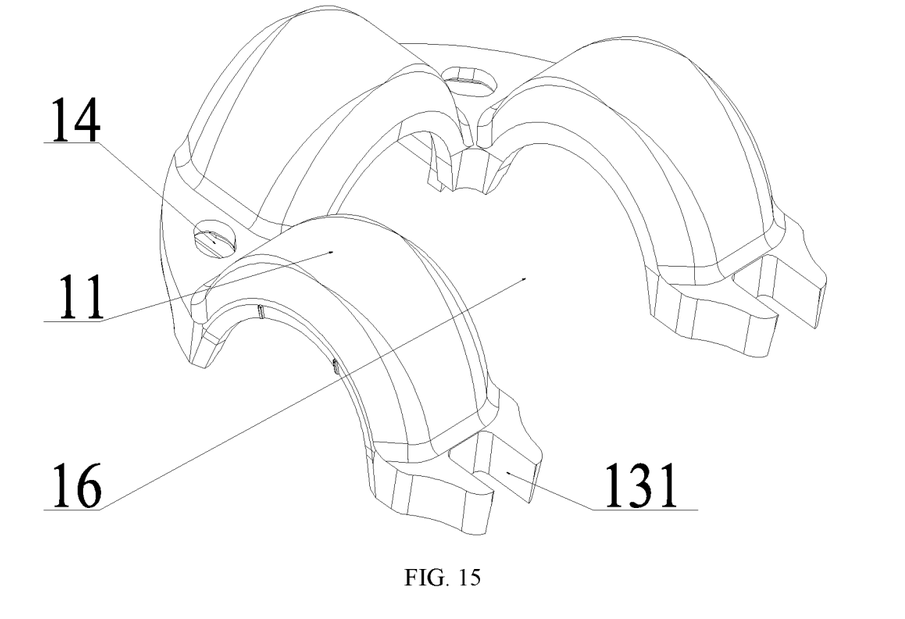
FIG. 15 is a perspective view showing the second engaging shell in FIG. 3.
Figure 16:
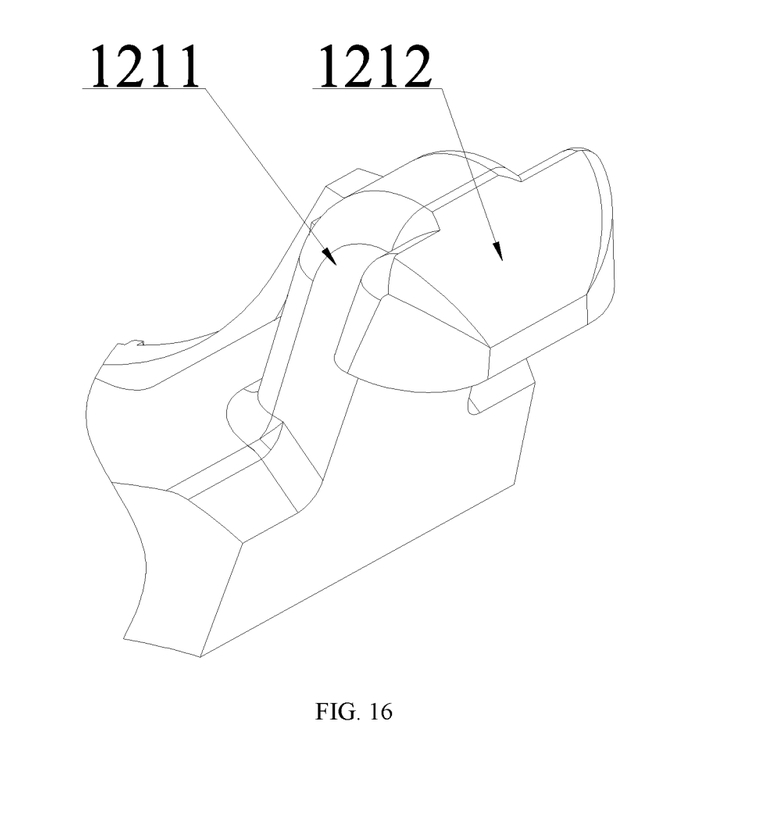
FIG. 16 is a structural schematic diagram showing the engaging claw in FIG. 4.

As shown in FIG. 4 and FIG. 15, the first clamp shell 12 is provided with the engaging claw 121, the second clamp shell 13 is correspondingly provided with the engaging groove 131. As shown in FIG. 16, the engaging claw 121 includes the clamping neck 1211 for being engaged with the engaging groove 131 and the engaging head 1212. A width of the engaging head 1212 is larger than a width of the engaging groove 131.

Figure 17:
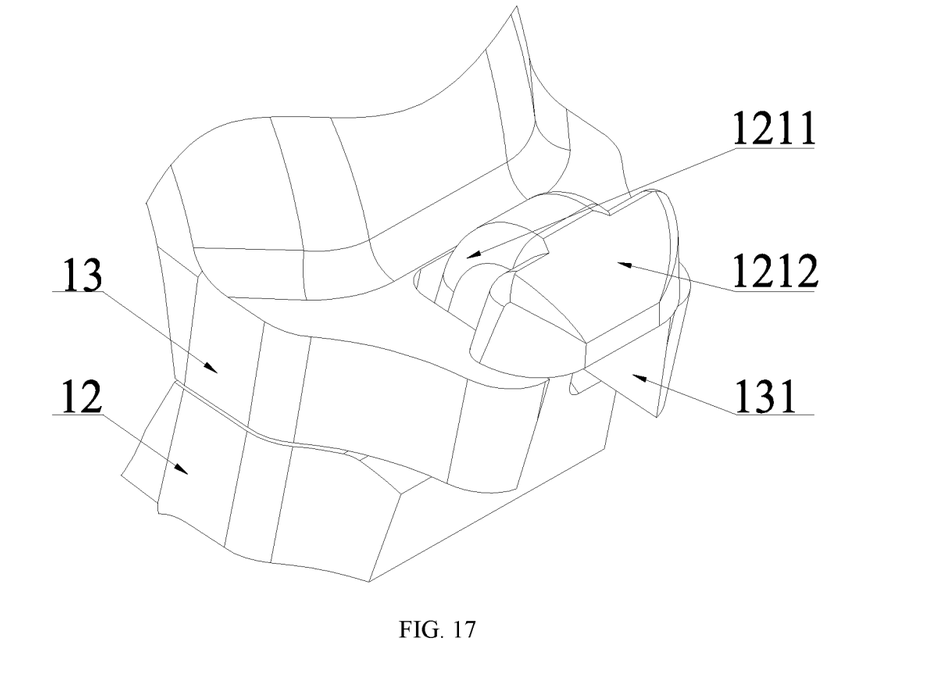
FIG. 17 is a structural schematic diagram showing the area C in FIG. 3.

In combination with FIG. 17, during use, the clamping neck 1211 is engaged into the engaging groove 131 first, the engaging head 1212 contacts an outer side of the engaging groove 131 to prevent the two clamp shells from detaching. Then the bolt holes 14 are inserted with the bolt to realize a fixed connection. By providing the engaging claw 121 and the engaging groove 131, the first clamp shell 12 and the second clamp shell 13 can be conveniently connected and dismounted. Moreover, the number of bolt holes can be effectively reduced and the structure is simplified, while the connection requirements are met at the same time. The number and location of the engaging claws 121, the engaging grooves 131, and the bolt holes 14 can be set according to the specific shape and size of the clamp body 1.

The clamp body 1 of the present disclosure is made of cast iron and formed by foundry technology. The second clamp shell 13 is provided with the engaging groove 131. A body of the second clamp shell 13 and the engaging groove 131 can be integrally formed into one piece by using a sand mold during casting, with no need to use a core to form the engaging groove, saving the cost of producing the core, simplifying the manufacturing process, and ensuring the true position of the engaging groove 131 as well.

The three-way clamp of the present disclosure can be used for the connection of pipelines, and the connection can be achieved by merely inserting the pipes to be connected into the engaging portion of the present disclosure and then tightening the bolts. The integrated structure simplifies the operating steps of the connection and improves the operating efficiency.

Figure 1:
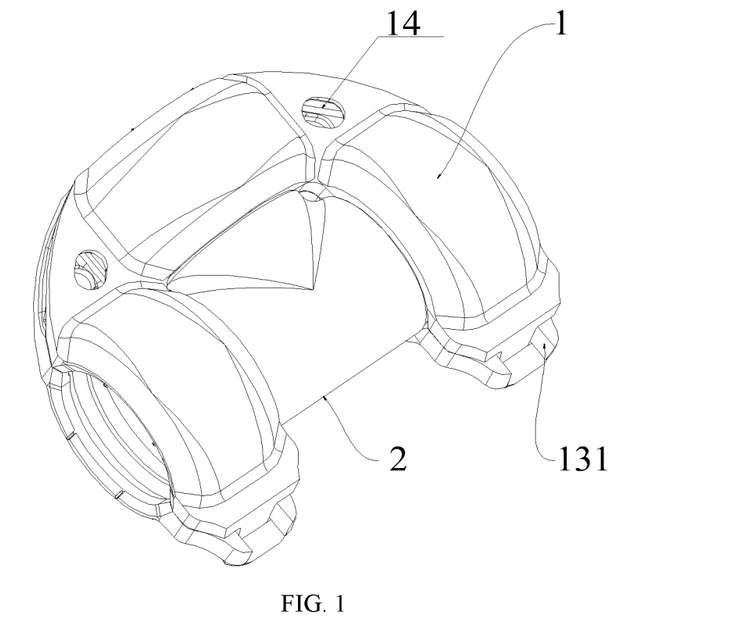
FIG. 1 is a perspective view of an embodiment of the present disclosure.

As shown in FIG. 1, the present disclosure provides a connector prefabricated component including the foregoing clamp, including the connecting pipe 2 fixed in the clamp boy 1.

Figure 10:
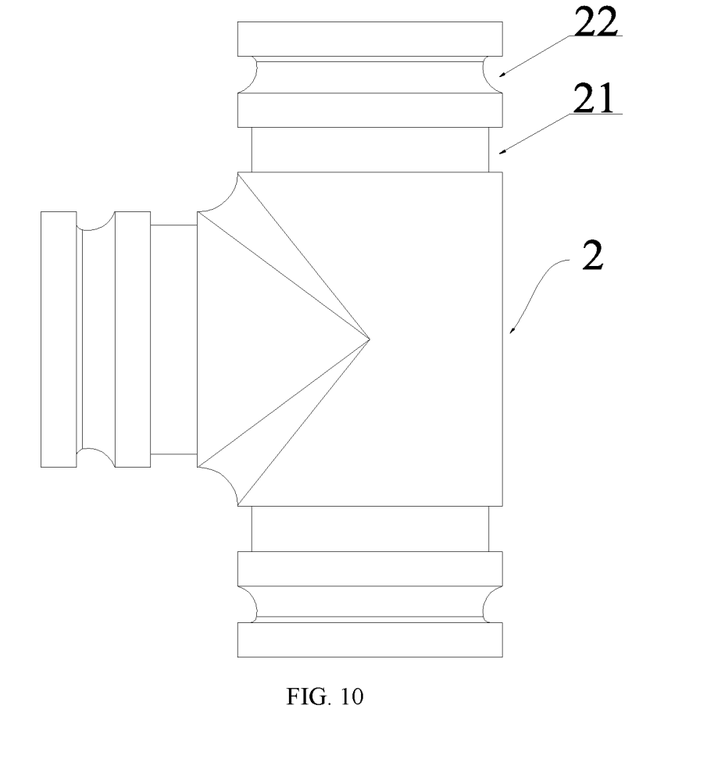
FIG. 10 is a structural schematic diagram showing a connecting pipe of an embodiment according to the present disclosure.

As shown in FIG. 10, the connecting pipe 2 includes three pipe openings. The engaging portions 11 and the pipe openings are in a one-to-one correspondence. The accommodating cavity 15 of each engaging portion 11 is mounted with the sealing component 3 for sleeving the pipe opening.

Each pipe opening is provided with the first engaging groove 21 and the sealing engaging groove 22. Preferably, a cross-section of a bottom of the sealing engaging groove 22 is arc-shaped to improve a sealing property.

Figure 11:
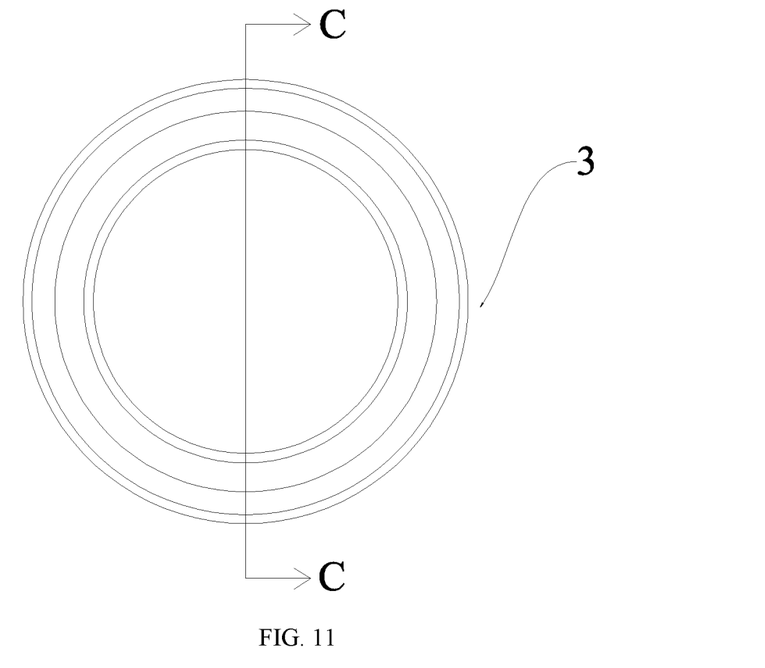
FIG. 11 is a structural schematic diagram showing a sealing component of an embodiment according to the present disclosure.
Figure 12:
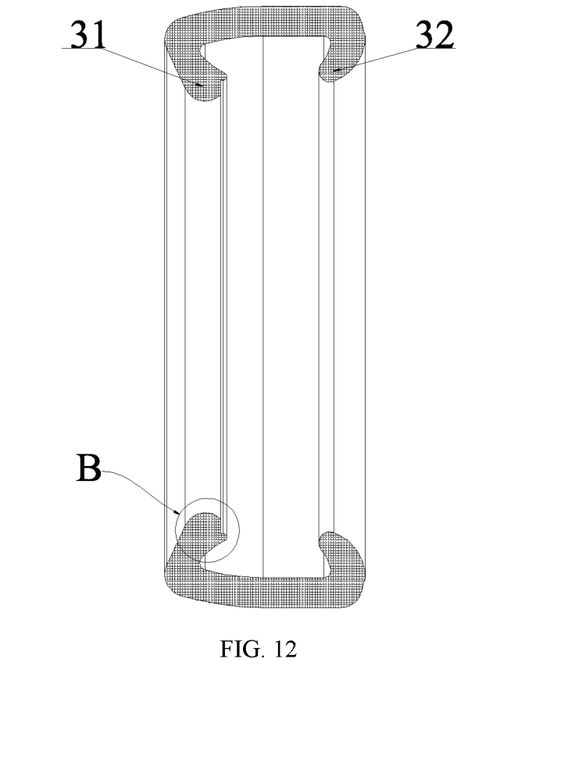
FIG. 12 is a schematic diagram showing a structure of an embodiment in FIG. 11 in a C-C direction.

As shown in FIG. 11 and FIG. 12, the sealing component 3 includes the pipe body 3 capable of expanding and retracting elastically. The first sealing ring 31 and the second sealing 32 ring are provided on an inner wall of the pipe body.

Figure 8:
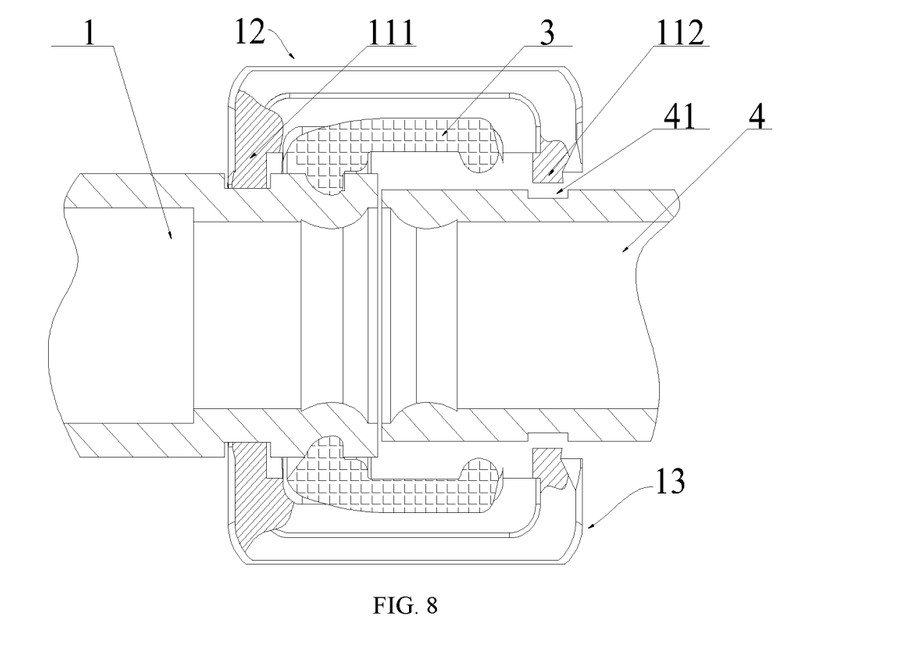
FIG. 8 is a schematic diagram showing the structure in a loose state in FIG. 7 in a B-B direction.
Figure 9:
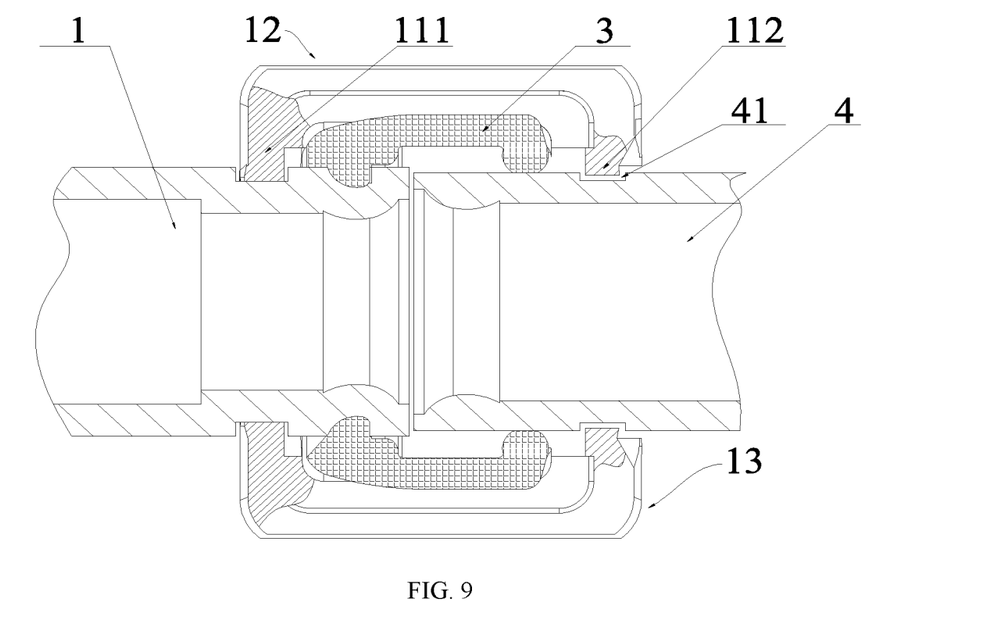
FIG. 9 is a schematic diagram showing the structure in a compact state in FIG. 7 in a B-B direction.
Figure 13:
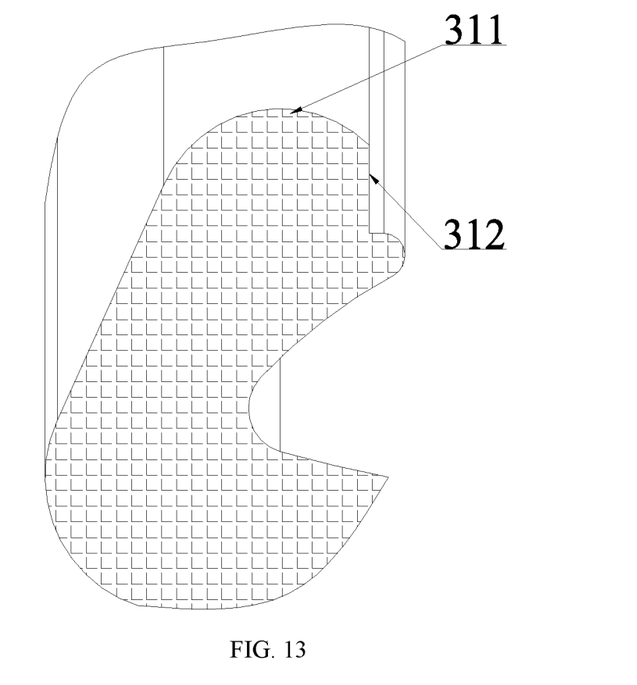
FIG. 13 is a structural schematic diagram showing the area B in FIG. 12.
Figure 14:
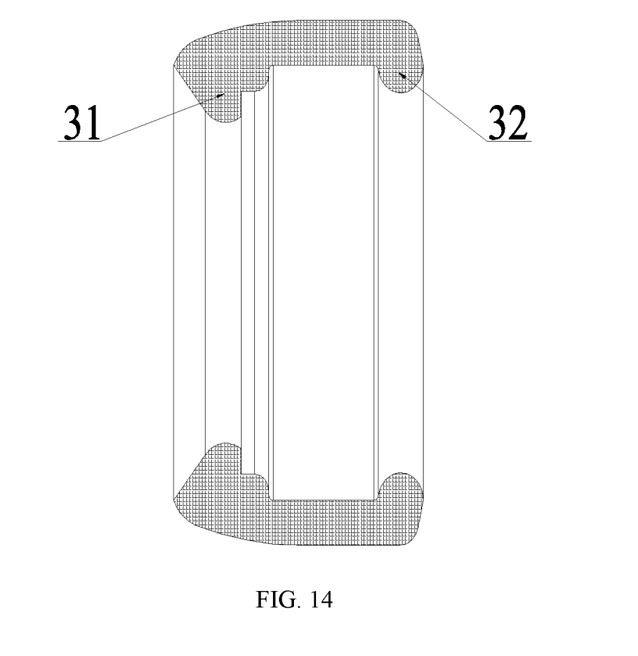
FIG. 14 is a schematic diagram showing a structure of an embodiment in FIG. 11 in a C-C direction.

In combination with FIG. 8, during use, the pipe opening of the sealing component 3 is elastically expanded and sleeved onto the pipe opening of the connecting pipe 2. The first sealing ring 31 is engaged into the sealing engaging groove 22 of the connecting pipe 2. Subsequently, in combination with FIG. 13, the first sealing ring 31 is provided with the arc-shaped protrusion 311 for matching with the arc-shaped bottom of the sealing engaging groove 22, thus increasing the contact area between the first sealing ring and the sealing engaging groove to enhance the sealing effect. More preferably, the first sealing ring 31 is further provided with the limit surface 312 for limiting an axial movement of the sealing component 3 and increasing its stability. The second sealing ring 32 is in a clearance fit with the straight pipe 4. The straight pipe 4 can be readily inserted when the second sealing ring is in a loose state. In combination with FIG. 9, after compressing, the second sealing ring 32 is partially deformed under an action of a pressing force and abuts against a pipe body of the straight pipe 4 to achieve sealing. Referring to FIG. 14, a cross-section of the second seal ring 32 is arc-shaped, thus, it can obtain a large deformation amount to achieve a good sealing effect when abutting against the pipe body of the straight pipe 4. Further, referring to FIG. 12, a cross-section of the second sealing ring 32 is barb-shaped, when the second sealing ring is in contact with the pipe body of the straight pipe 4, the deformation amount is further increased to further enhance the sealing effect.

Figure 6:
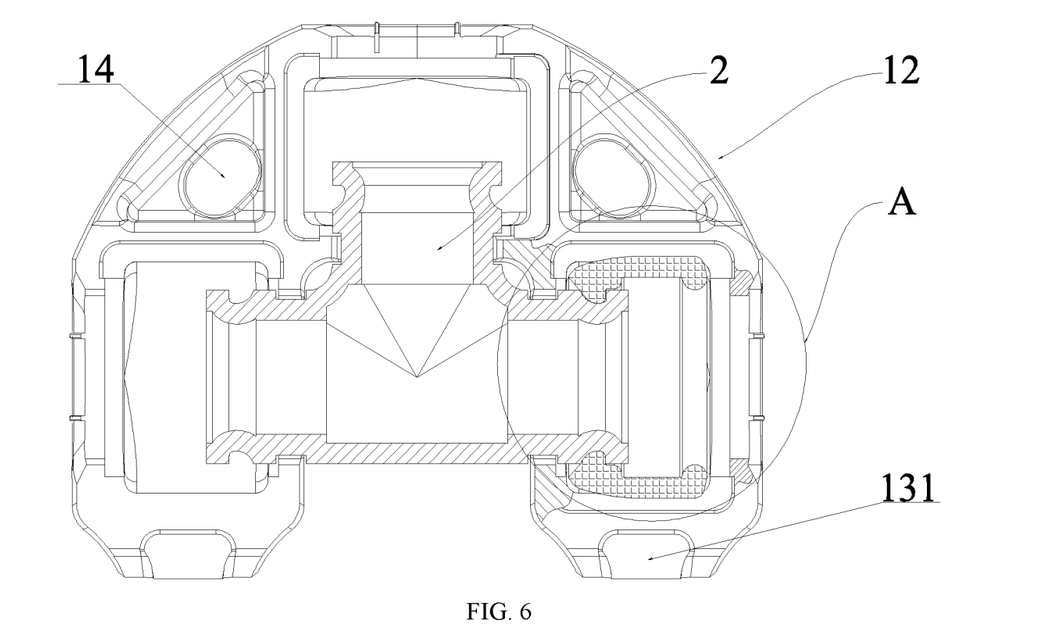
FIG. 6 is a schematic diagram showing the structure in FIG. 2 in an A-A direction.
Figure 7:
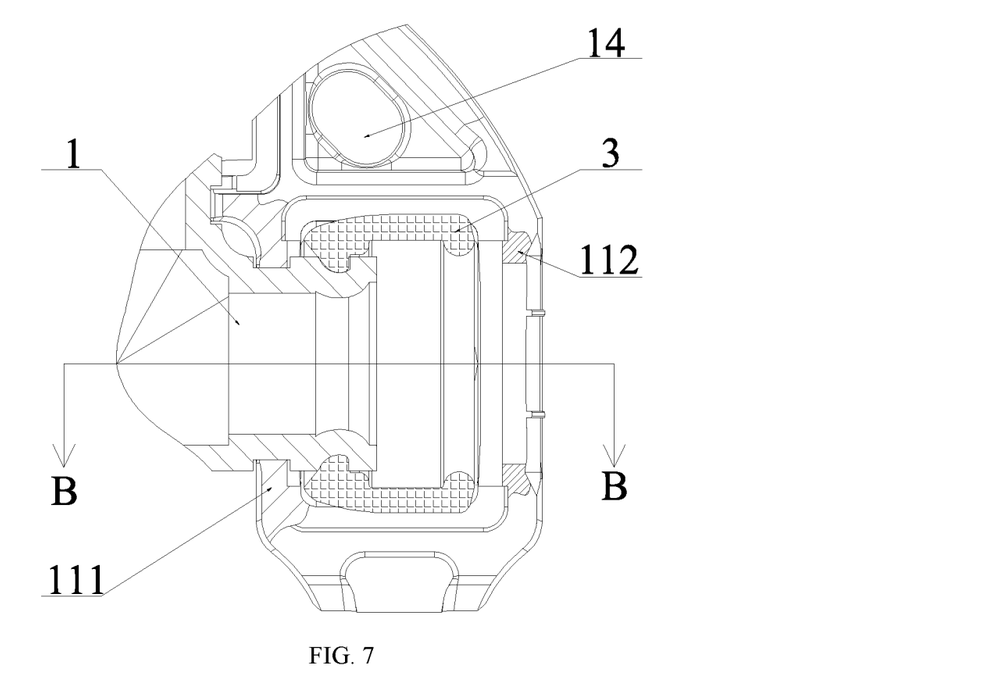
FIG. 7 is a structural schematic diagram showing the area A in FIG. 6.

As shown in FIG. 6 and FIG. 7, during the assembly of the present disclosure, the sealing component 3 is sleeved onto each pipe opening of the connecting pipe 2. The first sealing ring 31 is completely engaged into the sealing engaging groove 22. Then the first sealing ring and the sealing engaging groove are integrally put into the second clamp shell 13 (or the first clamp shell 12). The first engaging groove 21 of the pipe opening of each connecting pipe 2 is engaged with the corresponding first engaging ring 111, and the sealing component 3 is fixed in the corresponding accommodating cavity 15. Subsequently, the accommodating cavity is covered by the first clamp shell 12 (or the second clamp shell 13). The bolt holes 14 can be inserted with a bolt in advance and a nut can be pre-screwed. At that time, there is no need to completely screw the nut, and it is necessary to merely keep the connecting pipe 2 and the sealing component 3 fixed in the clamp body 1.

The connector prefabricated component of the present disclosure can be integrally delivered to a construction site for connecting the pipes. During construction, the straight pipe 4 to be connected is inserted into the sealing component 3, as shown in FIG. 8. After that, the nut is screwed, the second sealing ring 32 tightly presses the pipe body of the straight pipe 4, and the second engaging ring 112 is engaged into the second engaging groove 41 of the straight pipe 4 to achieve fixing. Compared with the prior art, the connector of the present disclosure has a low residual stress and a good sealing effect. The operations are simple, and the skill requirement for the operator is low. Therefore, the operating efficiency is improved, and the operating costs are reduced.

More preferably, in combination with FIG. 4 and FIG. 5, the reserved space 16 is provided between the engaging portions 11 of the first engaging ring 111 and the second engaging ring 112. After the connecting pipe 2 is fixed by the clamp body 1, the pipe body of the connecting pipe 2 is located in the reserved space 16. The reserved space 16 simplifies the structure of the clamp body 1 and reduces the overall weight. A difference in the outer dimensions of different connecting pipes 2 (such as an excessive material, partial protrusion, deformation of the pipe body, etc.) does not affect the stability and sealing property of the connections of the engaging portion 11, the connecting pipe 2, and the sealing component 3. The generality of the clamp body 1 and the fault tolerance range of the assembly error are improved.

In summary, the present disclosure provides the three-way clamp. The clamp body is formed by the first clamp shell and the second clamp shell which are capable of being assembled or disassembled. Each of the first clamp shell and the second clamp shell includes at least two engaging portions. The engaging portion includes the first engaging ring, the second engaging ring, and the accommodating cavity. The present disclosure also provides the connector prefabricated component including the clamp, wherein the connecting pipe is provided in the clamp for sleeving the sealing component. During construction, the straight pipe to be connected is inserted into the sealing component. Then the clamp body is tightened, and the sealing component tightly presses on the pipe body of the straight pipe to achieve sealing. The second engaging ring in the clamp body is engaged into the second engaging groove of the straight pipe to achieve fixing. Compared with the prior art, the present disclosure is highly integrated, which simplifies the complicated assembling processes into the insertion of the pipe heads and the tightening of the clamp, thereby reducing the skill requirements for the operator. The construction steps are simple, the installation error is small, the worker training cost is effectively reduced, and the construction efficiency is greatly improved.

Certainly, there are various kinds of other embodiments of the present disclosure. Those skilled in the art can correspondingly make changes and modifications according to the present disclosure without departing from the spirit and essence of the present disclosure. But all of these corresponding changes and modifications should belong to the protective scope of the appended claims of the present disclosure.

What is claimed is:

1. A connector prefabricated component comprising a three-way clamp and a connecting pipe, wherein the three-way clamp comprises a clamp body, and the connecting pipe is fixed in the clamp body; wherein the clamp body comprises a first clamp shell and a second clamp shell, and the first clamp shell and the second clamp shell are connected to or detached from each other; each of the first clamp shell and the second clamp shell comprises three engaging portions; each engaging portion of the three engaging portions comprises a first engaging ring, a second engaging ring, and an accommodating cavity for fixing a sealing component;

the first clamp shell is provided with an engaging claw, the second clamp shell is correspondingly provided with an engaging groove; the engaging claw comprises an engaging neck for being engaged into the engaging groove, and an engaging head connected to the engaging neck;

bolt holes corresponding to one another are respectively provided on the first clamp shell and the second clamp shell;

the connecting pipe comprises three pipe openings; the three engaging portions and the three pipe openings are in a one-to-one correspondence; the accommodating cavity of the each engaging portion is mounted with the sealing component for sleeving each pipe opening of the three pipe openings; and the sealing component comprises a pipe body, and the pipe body expands and retracts elastically; a first sealing ring and a second sealing ring are provided on an inner wall of the pipe body; and the each pipe opening of the three pipe openings is provided with a first engaging groove for being engaged with the first engaging ring and a sealing engaging groove for being engaged with the first sealing ring.

2. The connector prefabricated component according to claim 1, wherein a cross-section of the second sealing ring is arc-shaped.

3. The connector prefabricated component according to claim 1, wherein a cross-section of the second sealing ring is barb-shaped.

4. The connector prefabricated component according to claim 1, wherein a cross-section of a bottom of the sealing engaging groove is arc-shaped.

5. The connector prefabricated component according to claim 4, wherein the first sealing ring is provided with an arc-shaped protrusion matched with the bottom of the sealing engaging groove.

6. The connector prefabricated component according to claim 5, wherein the first sealing ring is further provided with a limit surface to limit an axial movement of the sealing component.

7. The connector prefabricated component according to claim 1, wherein the sealing component is made of rubber.

* * * * *